United States Patent
Li et al.

(10) Patent No.: US 11,288,354 B2
(45) Date of Patent: Mar. 29, 2022

(54) VERIFICATION CODE-BASED VERIFICATION PROCESSING

(71) Applicant: Alibaba Group Holding Limited, Grand Cayman (KY)

(72) Inventors: Zhiguo Li, Hangzhou (CN); Junli Shen, Hangzhou (CN)

(73) Assignee: Alibaba Group Holding Limited, George Town (KY)

(*) Notice: Subject to any disclaimer, the term of this patent is extended or adjusted under 35 U.S.C. 154(b) by 789 days.

(21) Appl. No.: 16/119,883

(22) Filed: Aug. 31, 2018

(65) Prior Publication Data
US 2018/0373860 A1 Dec. 27, 2018

Related U.S. Application Data

(63) Continuation of application No. PCT/CN2017/074319, filed on Feb. 21, 2017.

(30) Foreign Application Priority Data

Mar. 4, 2016 (CN) .......................... 201610125755.3

(51) Int. Cl.
*G06F 21/36* (2013.01)
*H04L 9/32* (2006.01)
(Continued)

(52) U.S. Cl.
CPC ............... *G06F 21/36* (2013.01); *H04L 9/32* (2013.01); *H04L 29/06* (2013.01); *H04L 63/08* (2013.01); *G06F 2221/2133* (2013.01)

(58) Field of Classification Search
CPC . G06F 21/36; H04L 9/32; H04L 29/06; H04L 63/08
(Continued)

(56) References Cited

U.S. PATENT DOCUMENTS 9,183,672 B1 * 11/2015 Hickman ................ G06T 17/00
9,264,419 B1    2/2016 Johansson et al.
(Continued)

FOREIGN PATENT DOCUMENTS

CN    101739720 A    6/2010
CN    102254355 A    11/2011
(Continued)

OTHER PUBLICATIONS

Borah, Sagarika, and Bhogeswar Borah. "Watermarking Techniques for Three Dimensional (3D) Mesh Authentication in Spatial Domain." 3D research 9.3 (2018): 1-22. (Year: 2018).*
(Continued)

*Primary Examiner* — Thanhnga B Truong
*Assistant Examiner* — Angela R Holmes
(74) *Attorney, Agent, or Firm* — Lee & Hayes, P.C.

(57) ABSTRACT

A method including a server acquires verification code parameters required for generating a verification code; the server uses the verification code parameters as an input to a three-dimensional model to generate a three-dimensional image, wherein recognizable content corresponding to a specified visual focus position of a user is embedded in the three-dimensional image; and the server sends the three-dimensional image to a client terminal as a verification code for display.

20 Claims, 9 Drawing Sheets

(51) Int. Cl.
H04L 29/06 (2006.01)
H04L 9/40 (2022.01)
(58) Field of Classification Search
USPC .......................................................... 726/7
See application file for complete search history.

(56) References Cited

U.S. PATENT DOCUMENTS

| | | | |
|---|---|---|---|
| 9,842,204 B2 | 12/2017 | Bailey | |
| 10,331,945 B2 | 6/2019 | Piccolotto et al. | |
| 2003/0117511 A1* | 6/2003 | Belz | H04N 5/232125 348/333.11 |
| 2004/0098628 A1* | 5/2004 | Butler | G06F 21/46 726/6 |
| 2004/0109614 A1* | 6/2004 | Enomoto | H04N 1/624 382/275 |
| 2006/0039690 A1* | 2/2006 | Steinberg | G06T 7/0002 396/155 |
| 2008/0181507 A1* | 7/2008 | Gope | G06T 7/194 382/190 |
| 2008/0209223 A1* | 8/2008 | Nandy | H04L 63/08 713/185 |
| 2009/0187986 A1 | 7/2009 | Ozeki | |
| 2010/0245213 A1 | 9/2010 | Ideguchi | |
| 2011/0043515 A1 | 2/2011 | Stathis | |
| 2011/0292031 A1 | 12/2011 | Zhu et al. | |
| 2012/0291122 A1 | 11/2012 | Chow et al. | |
| 2012/0323700 A1 | 12/2012 | Aleksandrovich et al. | |
| 2014/0115682 A1* | 4/2014 | He | H04W 4/38 726/7 |
| 2014/0237563 A1 | 8/2014 | Zhang | |
| 2015/0033305 A1* | 1/2015 | Shear | G06F 21/6218 726/6 |
| 2018/0373860 A1 | 12/2018 | Li et al. | |

FOREIGN PATENT DOCUMENTS

| | | |
|---|---|---|
| CN | 102663672 A | 9/2012 |
| CN | 102768754 A | 11/2012 |
| CN | 102831568 A | 12/2012 |
| CN | 103220142 A | 7/2013 |
| CN | 103514393 A | 1/2014 |
| CN | 103853968 A | 6/2014 |
| CN | 104657654 A | 5/2015 |
| EP | 2330529 | 6/2011 |
| EP | 2410450 A1 | 1/2012 |
| JP | 2009175988 A | 8/2009 |
| JP | 2013539124 A | 10/2013 |
| WO | WO2014107618 A1 | 7/2014 |

OTHER PUBLICATIONS

Translation of JP Office Action dated Mar. 9, 2021 for JP Application No. 2018-546438, a counterpart foreign application for U.S. Appl. No. 16/119,883, 8 pages.
Translation of CN Office Action from Corresponding CN Application No. 201610125755.3 dated Nov. 4, 2019, a counterpart foreign application for U.S. Appl. No. 16/119,883 , 11 pages.
Translation of CN Search Report from Corresponding CN Application No. 201610125755.3 dated Nov. 4, 2019, a counterpart foreign application for U.S. Appl. No. 16/119,883 , 2 pages.
The Extended European Search Report dated Jul. 19, 2019 for European Patent Application No. 17759166.6, a counterpart of U.S. Appl. No. 16/119,883, 5 pages.
Susilo et al, "STE3D-CAP: Stereoscopic 3D Captcha", International Conference on Computer Analysis of Images and Patterns, CAIP 2017: Computer Analysis of Images and Patterns, Lecture Notes in Computer Science, Springer, Berlin, Heidelberg, pp. 221-240.
Cui et al, "A 3-layer Dynamic CAPTCHA Implementation", Journal of Wuhan University of Technology, School of Computer Science, Wuhan University, Wuhan, China, vol. 32, No. 11, Jun. 2010.
Translation of 2nd CN Office Action from Corresponding CN Application No. 201610125755.3 dated Jul. 3, 2020, a counterpart foreign application for U.S. Appl. No. 16/119,883 , 13 pages.
Translation of 2nd CN Search Report from Corresponding CN Application No. 201610125755.3 dated Jun. 16, 2020, a counterpart foreign application for U.S. Appl. No. 16/119,883 , 1 page.
Wright et al, "Cryptology and Network Securit", 9th International Conference, CANS 2010, Kuala Lumpur, Malaysia, Dec. 12-14, 2010, Proceedings, 355 Pages.
Japanese Office Action dated Oct. 26, 2021 for Japanese Patent Application No. 2018-546438, a foreign counterpart to U.S. Appl. No. 16/119,883, 6 pages.
Indian Office Action dated Aug. 31, 2021 for Indian Application No. 201817031379, a foreign counterpart to U.S. Appl. No. 16/119,883, 5 pages.
Singapore Office Action dated Nov. 26, 2021 for Singapore Patent Application No. 11201806933W, a foreign counterpart to U.S. Appl. No. 16/119,883, 9 pages.

* cited by examiner

VERIFICATION CODE-BASED VERIFICATION PROCESSING

CROSS REFERENCE TO RELATED PATENT APPLICATIONS

This application claims priority to and is a continuation of PCT Patent Application No. PCT/CN2017/074319, filed on 21 Feb. 2017, which claims priority to Chinese Patent Application No. 201610125755.3 filed on 4 Mar. 2016 and entitled "VERIFICATION CODE-BASED VERIFICATION PROCESSING METHOD AND APPARATUS", which are incorporated herein by reference in their entirety.

TECHNICAL FIELD

The present disclosure relates to the field of network security, and, more particularly, to verification code-based verification processing methods and apparatuses.

BACKGROUND

Existing picture verification codes or CAPTCHA are classified into forms such as a copywriting verification code, selection of multiple pictures based on a text prompt, clicking at a position of a particular-color element in a picture based on a text prompt, and so on. However, graphical verification codes may be easily recognized automatically by using optical character recognition (OCR) technology. Moreover, in the foregoing three solutions, it is of high regularity to generate pictures from verification codes, and the content or template lacks variety. The verification codes may be cracked by intercepting text prompts or seeking for differences based on picture decompilation code analysis. In addition, multiple picture algorithm solutions for recognizing verification codes already exist. Therefore, the graphical verification codes have a relatively low security coefficient and poor user experience.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

According to an aspect of example embodiments of the present disclosure, a verification code-based verification processing method is provided, including that: a server acquires verification code parameters required for generating a verification code; the server uses the verification code parameters as an input to a three-dimensional model to generate a three-dimensional image, wherein recognizable content corresponding to a specified visual focus position of a user is embedded in the three-dimensional image; and the server sends the three-dimensional image to a client terminal as a verification code for display.

According to another aspect of the example embodiments of the present disclosure, a verification code-based verification processing apparatus is further provided. The apparatus is applied to a server and includes: a processing module configured to acquire verification code parameters required for generating a verification code, and use the verification code parameters as an input to a three-dimensional model to generate a three-dimensional image, wherein recognizable content corresponding to a specified visual focus position of a user is embedded in the three-dimensional image; and a communication module configured to send the three-dimensional image to a client terminal as a verification code for display.

According to another aspect of the example embodiments of the present disclosure, another verification code-based verification processing method is further provided, including that: a client terminal acquires verification code parameters required for generating a verification code; the client terminal uses the verification code parameters as an input to a three-dimensional model to generate a three-dimensional image, wherein recognizable content corresponding to a specified visual focus position of a user is embedded in the three-dimensional image; and the client terminal displays the three-dimensional image as a verification code.

According to still another aspect of the example embodiments of the present disclosure, a verification code-based verification processing apparatus is further provided. The apparatus is applied to a client terminal and includes: a processing module configured to acquire verification code parameters required for generating a verification code, and use the verification code parameters as an input to a three-dimensional model to generate a three-dimensional image, wherein recognizable content corresponding to a specified visual focus position of a user is embedded in the three-dimensional image; and a display module configured to display the three-dimensional image as a verification code.

The example embodiments of the present disclosure employ a technical means of sending a three-dimensional image to a client terminal as a verification code for display, thus increasing the difficulty of verification code recognition and improving the security of verification code verification, hence resolving the technical problem of low security of existing graphical verification codes.

BRIEF DESCRIPTION OF THE DRAWINGS

The accompanying drawings described herein are used to provide further understanding about the present disclosure and constitute a part of the present disclosure. Schematic example embodiments of the present disclosure and description thereof are used to explain the present disclosure, and do not constitute improper limitations to the present disclosure. In the accompanying drawings.

DETAILED DESCRIPTION

Figure 1:
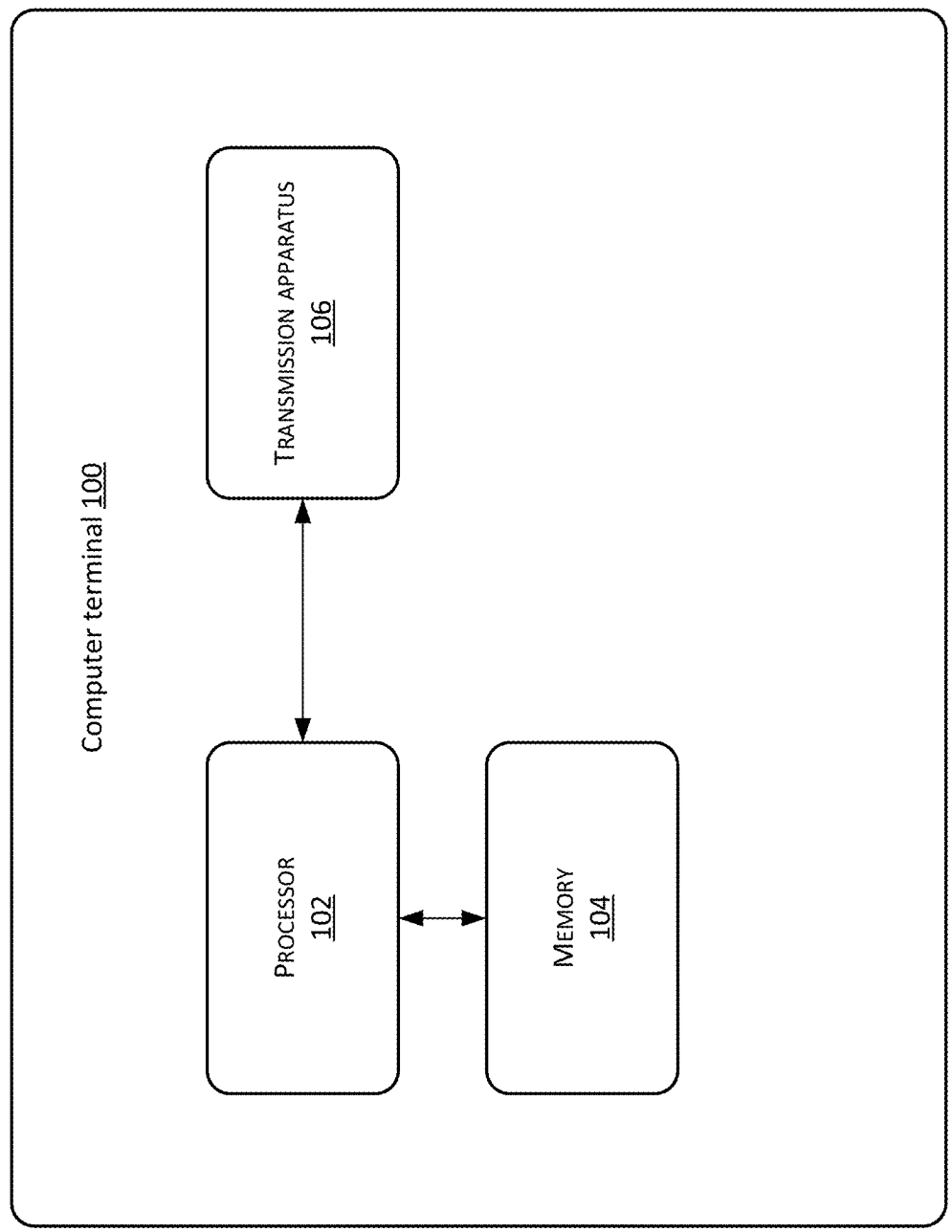
FIG. 1 is a hardware structural block diagram of a computer terminal of a verification code-based verification processing method according to an example embodiment of the present disclosure.

To enable those skilled in the art better understand the solutions of the present disclosure, the technical solutions in the example embodiments of the present disclosure will be described below with reference to the accompanying drawings in the example embodiments of the present disclosure. The example embodiments described are only some, rather than all, of the example embodiments of the present disclosure. All other example embodiments derived by those of ordinary skill in the art based on the example embodiments of the present disclosure without creative efforts should fall within the protection scope of the present disclosure.

It should be further noted that the terms such as "first" and "second" in the specification, the claims, and the accompanying drawings in the present disclosure are merely used to distinguish similar objects and are not necessarily used to describe a specific sequence or order. It should be understood that the data used in this manner may be interchanged in a proper case, so that the example embodiments of the present disclosure described here may be implemented in sequences different from the sequence shown or described here. Moreover, the terms "include" and "have" as well as their other variations are intended to cover non-exclusive inclusion, so that a process, method, system, product or device including a series of steps or units not only includes the steps or units clearly listed, but also may include other steps or units not clearly listed or other steps or units inherent to the process, method, product or device.

To make the example embodiments of the present disclosure easy to understand, technical terms used in the example embodiments of the present disclosure are explained as follows:

A depth of field refers to the depth of a three-dimensional image, that is, a measured front-rear distance range of a photographed object of which a clear image may be obtained in front of a camera lens or other imagers. In other words, after focusing, clear images may be formed at positions in front of and behind the focus, and this distance range from the position in front of the focus to the position behind the focus is referred to as the depth of field.

A level refers to a richness degree of content of a three-dimensional image. Images at different levels are located at different focus positions. An observer may see an image at a particular level only when the focus of his/her eyes falls at a corresponding position.

Example Embodiment 1

According to the example embodiments of the present disclosure, an example embodiment of a verification code-based verification processing method is further provided. It should be noted that steps shown in the flowchart in the accompanying drawings may be executed in a computer system such as a set of computer executable instructions. Moreover, although a logic sequence is shown in the flowchart, in some cases, the steps shown or described may be executed in a sequence different from the one shown here.

The method example embodiment provided in Example embodiment 1 of the present application may be executed in a mobile terminal, a computer terminal, or a similar arithmetic unit. For example, the method is run on a computer terminal. FIG. 1 is a hardware structural block diagram of a computer terminal of a verification code-based verification processing method according to an example embodiment of the present disclosure. As shown in FIG. 1, the computer terminal 100 may include one or more (only one is shown in the figure) processors 102 (the processor 102 may include, but is not limited to, a microprocessor MCU, a programmable logic device FPGA, or other processing apparatuses), a memory 104 configured to store data, and a transmission module 106 configured for a communication function. Those of ordinary skill in the art may understand that the structure shown in FIG. 1 is merely an example, which does not limit the structure of the foregoing electronic apparatus. For example, the computer terminal 100 may further include more or fewer components than those shown in FIG. 1 or has a configuration different from that shown in FIG. 1.

The memory 104 may be configured to store a software program and a module of application software, for example, a program instruction/module corresponding to the verification code-based verification processing method in this example embodiment of the present disclosure. The processor 102 may run the software program and module stored in the memory 104 to execute various functional applications and data processing, that is, implement a vulnerability detection method of the foregoing application program. The memory 104 may include a high-speed random access memory and may further include a non-volatile memory such as one or more magnetic storage apparatuses, a flash memory, or other non-volatile solid-state memories. In some examples, the memory 104 may further include memories remotely disposed with respect to the processor 102. The remote memories may be connected to the computer terminal 100 through a network.

The memory 104 may include a volatile memory, a random access memory (RAM) and/or a non-volatile storage device or the like in a computer readable medium, for example, a read only memory (ROM) or a flash RAM. The memory is an example of the computer readable medium.

The computer readable medium includes non-volatile and volatile media as well as movable and non-movable media, and may implement information storage by means of any method or technology. Information may be a computer readable instruction, a data structure, a module of a program, or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition in this text, the computer readable medium does not include transitory medium, such as modulated data signals and carriers.

Examples of the network include, but are not limited to, the Internet, an intranet, a local area network, a mobile communications network, and a combination of them.

The transmission apparatus 106 is configured to receive or send data through a network. Specific examples of the network may include a wireless network provided by a communications provider of the computer terminal 100. In an example, the transmission apparatus 106 includes a Network Interface Controller (NIC), which may be connected to other network devices through a base station and is thus able to communicate with the Internet. In an example, the transmission apparatus 106 may be a Radio Frequency (RF) module, which is configured to communicate with the Internet in a wireless manner.

Figure 2:
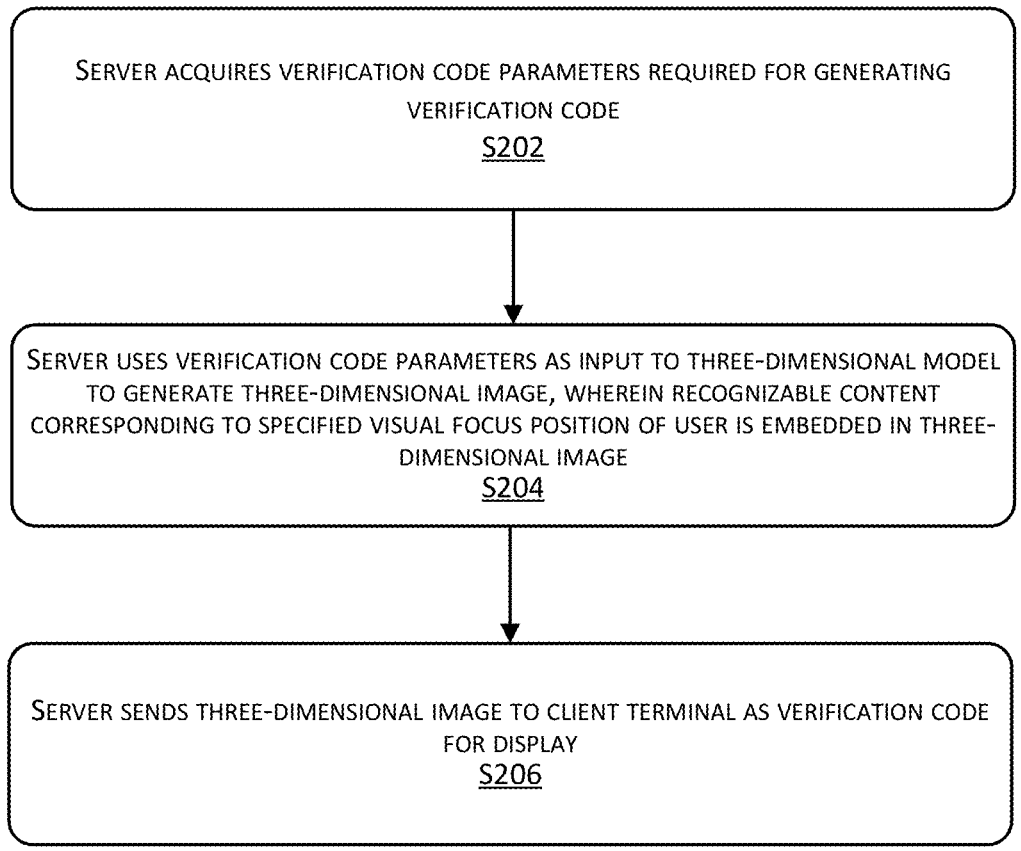
FIG. 2 is a schematic flowchart of an optional verification code-based verification processing method according to an example embodiment of the present disclosure.

In the foregoing running environment, the present application provides a verification code-based verification processing method as shown in FIG. 2. FIG. 2 is a schematic flowchart of an optional verification code-based verification processing method according to an example embodiment of the present disclosure. As shown in FIG. 2, the method includes steps S202 to S206:

Step S202. A server acquires verification code parameters required for generating a verification code.

Optionally, the "acquire" in step S202 may be embodied as acquisition from a third-party device or local acquisition (for example, when the step is performed by a server, the verification code parameters may be acquired from parameters pre-stored in the server).

The verification code parameters may include, but are not limited to, one or more of the following: text, an image, and a distortion parameter, a position or a color of the text or image.

Optionally, the verification code parameters in step S202 may be acquired in advance or acquired in real time upon triggering. The real-time acquisition upon triggering may be expressed as, but is not limited to, the following implementation process: receiving a verification code acquisition request of the client terminal before the verification code parameters required for generating a verification code are acquired, wherein the request may be used for triggering execution of step S202.

Step S204. The server uses the verification code parameters as an input to a three-dimensional model to generate a three-dimensional image, wherein recognizable content corresponding to a specified visual focus position of a user is embedded in the three-dimensional image (i.e., content that an observer may see only when the focus of his/her eyes falls at the specified visual focus position, or content that an observer may see only when the observer observes the three-dimensional image at a particular angle). The recognizable content in the three-dimensional image is content corresponding to the specified visual focus position. Therefore, the observer may recognize the recognizable content only when the observer observes from the specified visual focus position, thus enhancing the security of the verification code recognition process.

Optionally, the three-dimensional model mentioned in this step may be any model capable of generating a three-dimensional image in the related art, such as a 3D MAX model. However, the three-dimensional model is not limited to the 3D MAX model.

Popularly speaking, generation of the three-dimensional image in this step means enabling a person to directly see a three-dimensional image in a plane by using a visual difference between two eyes of the person and an optical reflection principle. An object in the image may be protruded from the image or hidden in the image, and this is mainly embodied based on light-shadow contrast, real-virtual contrast, and bright-shade contrast. The observer may observe the object in the image at a particular angle or by using a special device. The principle is that the observer may observe a three-dimensional image by focusing the eyesight in rear of (a distant position) or in front of (a near position) of the image. The purpose of changing the visual focus position is to make two repeated images adjacent on the three-dimensional image "look as if" they overlap with each other, and to produce a stereoscopic sense by using a difference between the overlapping images. Specifically, generation of the three-dimensional image may be implemented through, but is not limited to, the following processing process:

(1) A background picture and a user-recognizable foreground picture are generated according to the verification code parameters.

The foreground picture is a three-dimensional graph that may be recognized by an observer from the three-dimensional image. The observer may see a three-dimensional image from a planar image because various parts of the foreground (also known as a template) of the image have different gray scales, and when human eyes capture these subtle gray scale differences, a corresponding three-dimensional graph may be simulated in the brain. A position with a smaller gray scale (whiter in the template) in the image looks closer to the observer, and a position with a larger gray scale (darker in the template) in the image looks farther away from the observer.

The background picture refers to a visual illusion picture seen by an observer, that is, the planar image itself. In principle, a background picture with a stronger visual illusion effect should be selected. Regular images (for example, repeated images such as leaves, circles, and blocks) should be avoided to prevent that the observer pays too much attention to a planar image when observing the three-dimensional image and thus ignores gray scale information (that is, the recognizable content) hidden in the three-dimensional image.

(2) The background picture and the foreground picture at different levels are disposed at different visual focus positions according to a preset depth of field to generate the three-dimensional image. That is, picture synthesis is carried out based on the "depth of field" and "levels" to generate a two-dimensional picture. The depth of field should not be set to an excessively large value, so as to avoid making it difficult to observe the three-dimensional image. The level refers to a richness degree of content in the three-dimensional image. Images at different levels are located at different focus positions. An observer may see an image at a particular level only when the focus of his/her eyes falls at a corresponding position. Hence, levels may be arranged reasonably to produce a multi-level image, thus increasing difficulty.

Optionally, in order to increase the difficulty in cracking a verification code, one or more verification code parameters may be randomly selected from the acquired verification code parameters required for generating a verification code to serve as verification code parameters for generating the background picture and the foreground picture. The background picture and the foreground picture are generated according to the randomly selected verification code parameters. As such, verification code parameters such as a position, a direction, content, and a color system are randomly generated during verification code synthesis, thus increasing the difficulty in generating the verification code and reducing a repetitive rate of the picture verification code is reduced. Moreover, a verification code generation rule cannot be found when the image of the verification code is decompiled.

Figure 3:
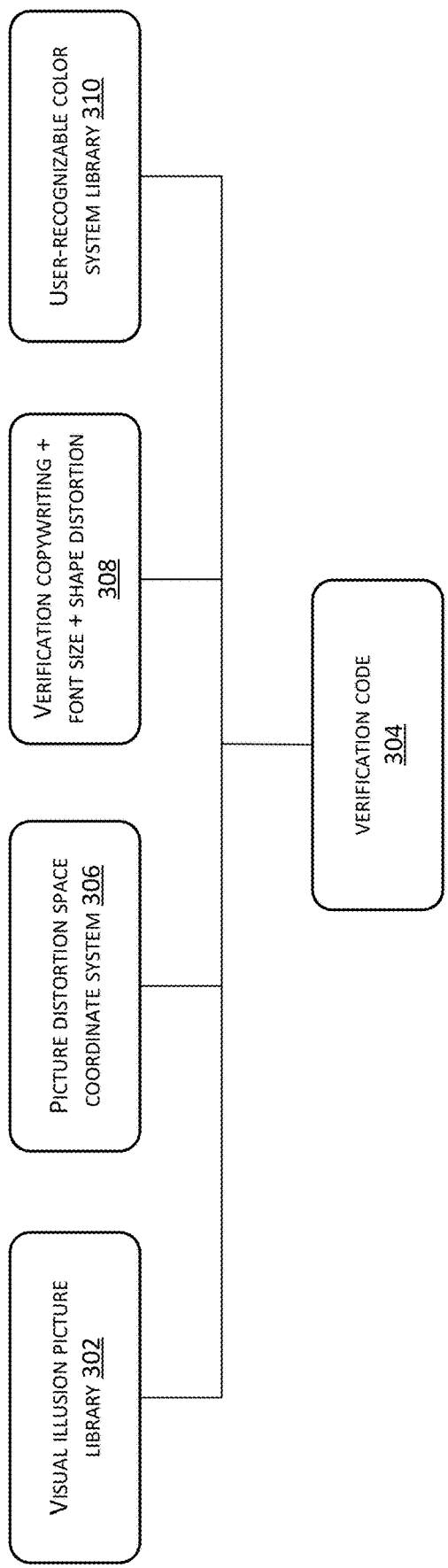
FIG. 3 is a schematic diagram of an optional principle of generating a verification code according to an example embodiment of the present disclosure.

To facilitate comprehension, a process of generating a verification code is described in detail below by using the principle shown in FIG. 3 as an example. FIG. 3 is a schematic diagram of an optional principle of generating a verification code according to an example embodiment of the present disclosure. As shown in FIG. 3, a visual illusion picture generation library 302 for use in random generation of a verification code 304 is developed based on rule methods such as edge fusion, lamination, and deformation. A text region may be inserted in a visual illusion picture in the visual illusion picture library 302, so that verification code text positions may be shifted and distorted to reduce the probability of verification code repeated combination. That is, image and text and the like are distorted by using a picture distortion space coordinate system 306 in FIG. 3. Specified verification text is randomly selected from the following: text (Chinese characters, English letters, and digits), a font size, and a combination of text and font size, thus increasing the combination probability of verification copywriting and optional modes of the user (for example, Chinese characters, Chinese characters and English letters, digits, English letters+digits, Chinese characters+digits, and Chinese characters+English letters+digits). Certainly, the shape of the text may also be distorted. That is, verification copywriting, font size, and shape distortion 308 are also used for generating the verification code 304. To achieve variation diversity of visual illusion pictures, reduce the repetition probability of verification codes on a client terminal, and make verification codes more recognizable to the user, a user-recognizable color system library 310 for verification code pictures and copywriting may be established to further increase the difficulty of machine cracking.

Step S206. The server sends the three-dimensional image to a client terminal as a verification code for display. The sending process of this step may be implemented by using a communication process in the related art. However, the verification code sent in this case is a three-dimensional image. Therefore, in order to facilitate an observer (i.e., the user) on the client terminal side to read effective information (i.e., the recognizable content) rapidly, when the three-dimensional image is sent to the client terminal as a verification code, the specified visual focus position for prompting the user to recognize the recognizable content from the three-dimensional image may also be sent to the client terminal, such that the observer finds the visual focus position rapidly, thus improving the recognition efficiency of the verification code and further improving user experience.

Optionally, the specified visual focus position and the verification code may be sent separately as two independent processes or may be sent simultaneously. For example, if the specified visual focus position and the verification code are sent simultaneously, indication information for indicating the specified visual focus position may be inserted into the three-dimensional image and sent to the client terminal.

Figure 4:
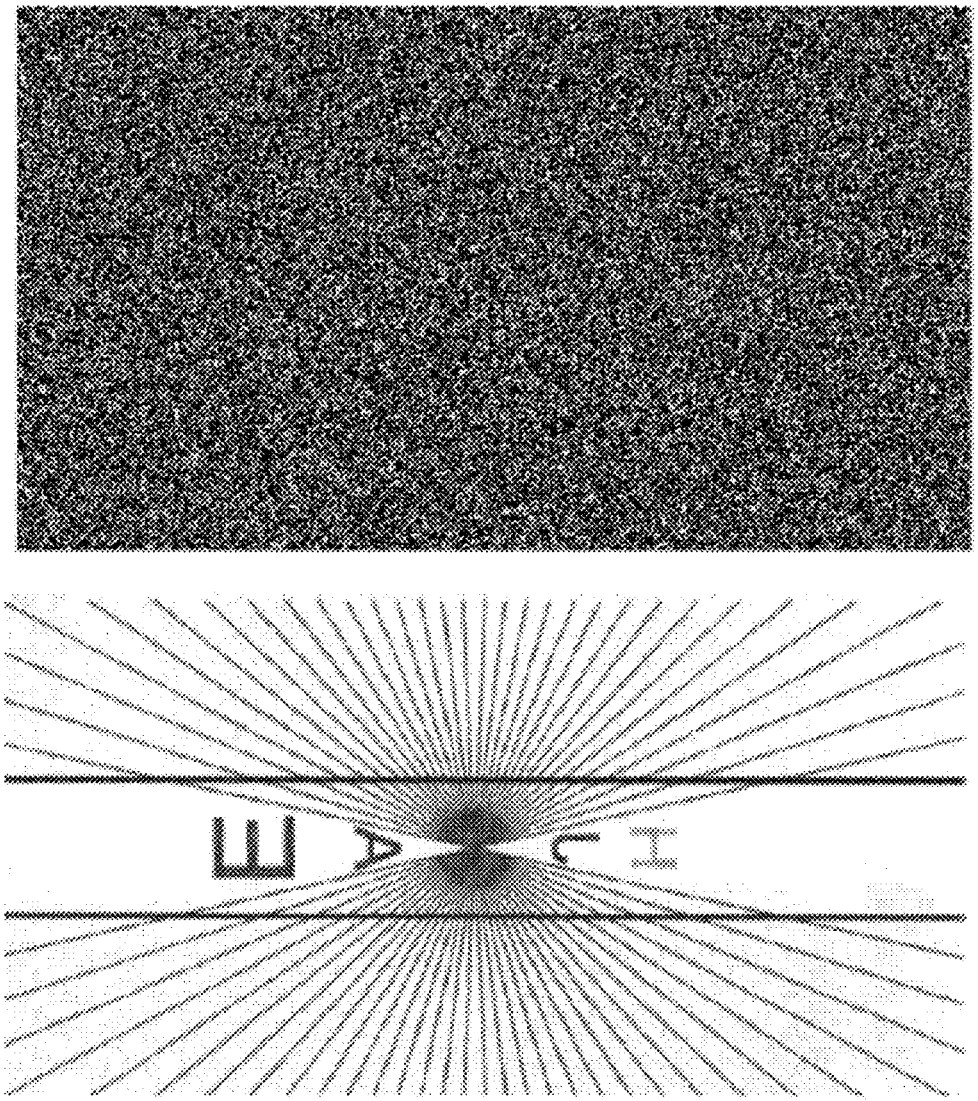
FIG. 4 is a schematic diagram of an optional three-dimensional verification code according to an example embodiment of the present disclosure.

FIG. 4 is a schematic diagram of an optional three-dimensional verification code according to an example embodiment of the present disclosure. As shown in FIG. 4, for a three-dimensional code generated based on the foregoing principle, the left picture in FIG. 4 may be seen only when the terminal is at a particular angle (such as 45 degrees) with respect to a visual angle of the observer (that is, the user). At other angles, letters in the verification code are fuzzy, as shown in the right picture in FIG. 4.

Figure 5:
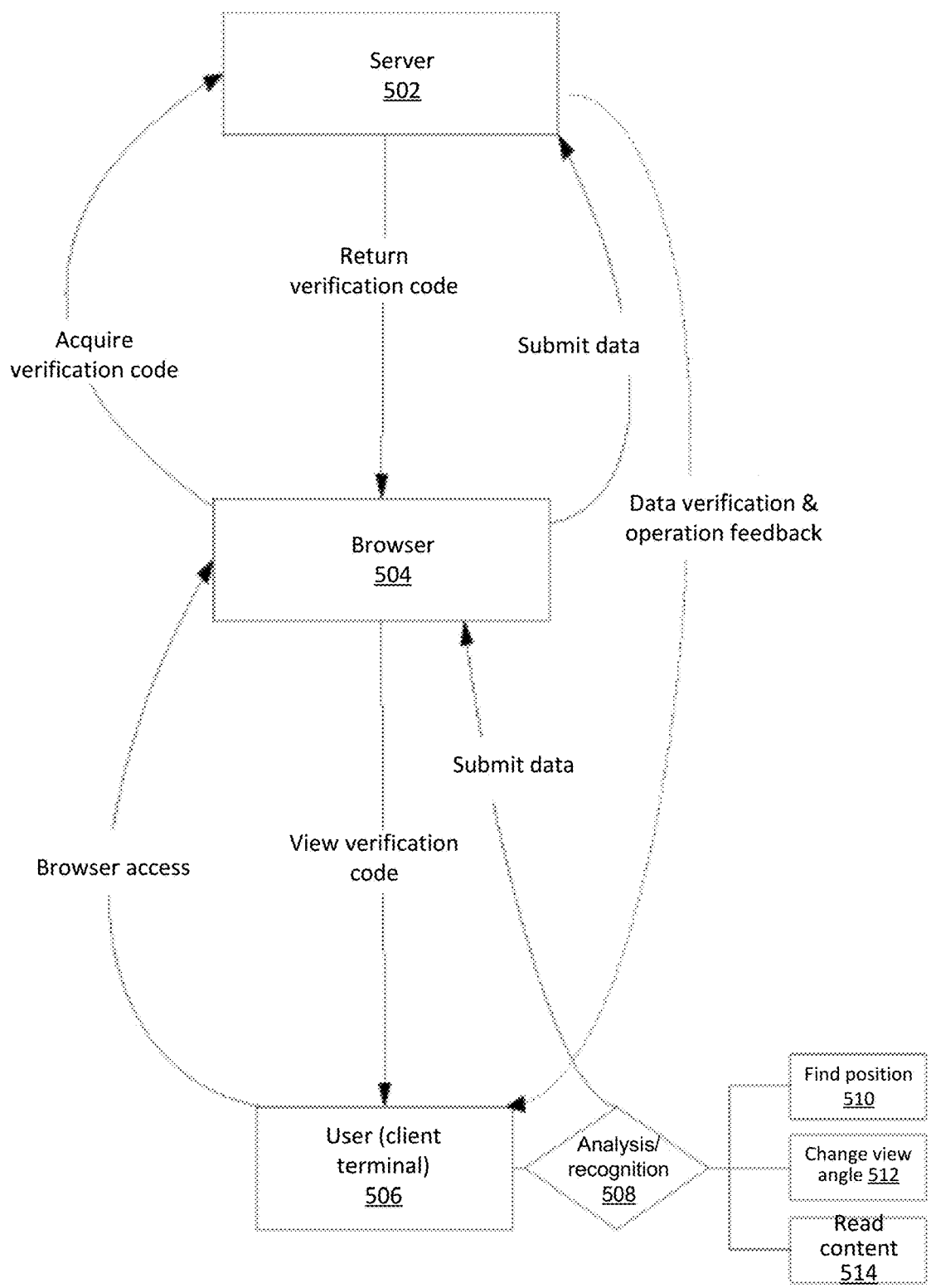
FIG. 5 is a schematic diagram of an optional verification code verification process based on a Browser/Server architecture according to an example embodiment of the present disclosure.

FIG. 5 is a schematic flowchart of an optional verification code verification process based on a Browser/Server architecture according to an example embodiment of the present disclosure. As shown in FIG. 5, a server 502 receives, through a browser 504, a verification code acquisition request sent by a user via a client terminal 506 to the server 502 through the browser 504 and feeds the verification code back to the browser 504 for the user to view.

The user submits data (that is, the user inputs recognized verification copywriting in the browser 504 and submits it to the server 502) after performing the following analysis and recognition 508 operations on the verification code: finding position 510 for observation, changing view angle 512, and reading content 514 from the verification code.

The server terminal 502 determines security of the user according to user access characteristics (such as UA, recognition time, and the number of accesses) and the submitted verification copywriting, and returns a result to the browser 504 to carry out user operation feedback.

It should be noted that for ease of description, the foregoing method example embodiments are all described as a series of action combinations. However, those skilled in the art should understand that the example embodiments of the present disclosure are not limited to the described sequence of the actions, because some steps may be performed in another sequence or at the same time according to the present disclosure. In addition, those skilled in the art should also understand that the example embodiments described in this specification all belong to example embodiments, and the involved actions and modules are not necessarily mandatory to the present disclosure.

Through the description of the implementation manners above, those skilled in the art may clearly understand that the method according to the foregoing example embodiment may be implemented by software plus a necessary hardware platform, and certainly may also be implemented by hardware. However, in many cases, the former is a better one. Based on such understanding, the technical solution of the present disclosure essentially, or the part making contributions to the prior art, may be embodied in the form of a software product. The computer software product is stored in a storage medium (such as a ROM/RAM, a magnetic disk, or an optical disc) and includes several instructions to enable a terminal device (which may be a mobile phone, a computer, a server, a network device or the like) to execute the methods in the example embodiments of the present disclosure.

Example Embodiment 2

Figure 6:
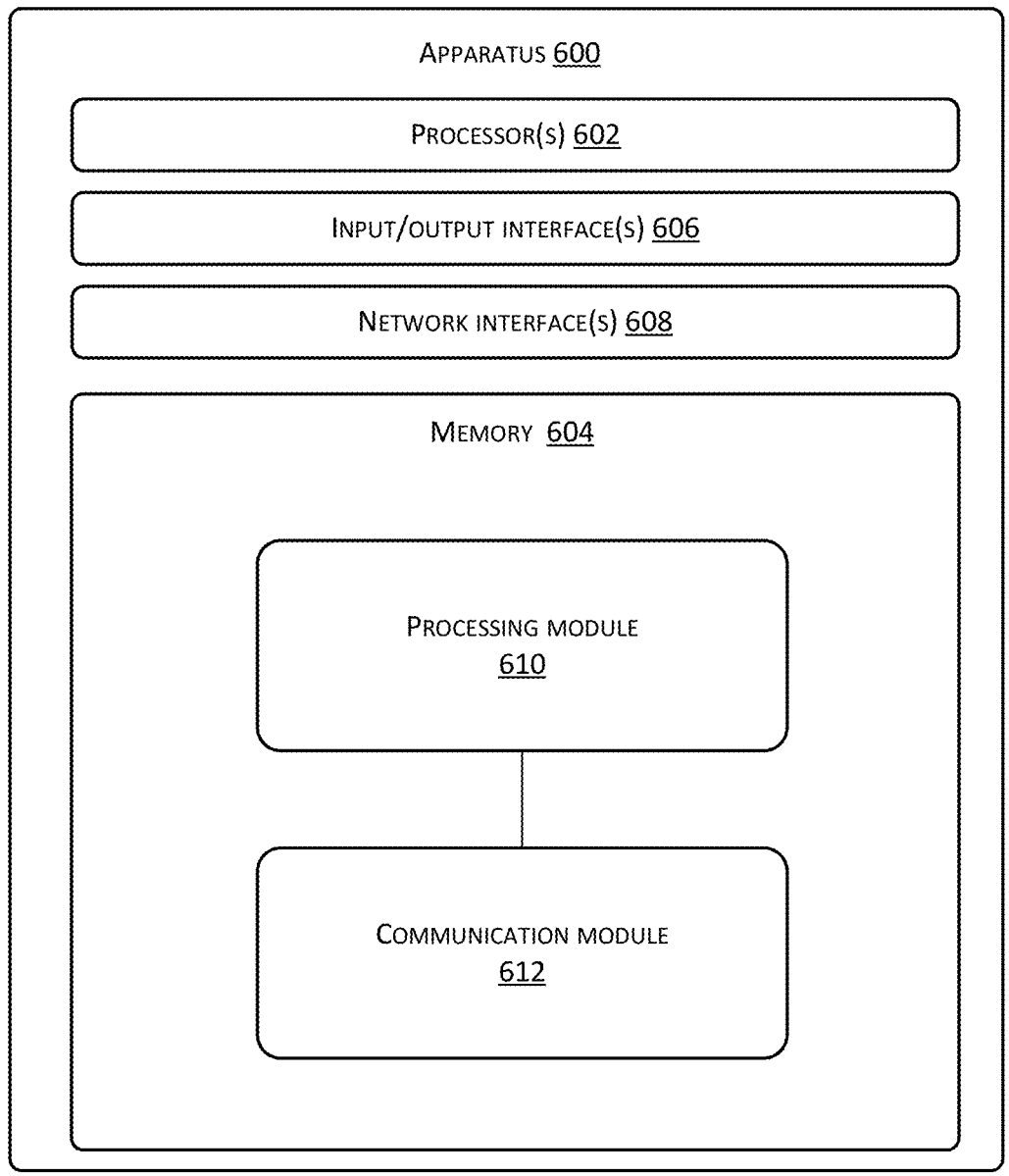
FIG. 6 is a schematic structural diagram of an optional verification code-based verification processing apparatus according to an example embodiment of the present disclosure.

According to this example embodiment of the present disclosure, an apparatus for implementing the foregoing verification code-based verification processing method is further provided. The apparatus may run on the computer terminal shown in FIG. 1 or may run on a computer terminal which has more or fewer functional modules than the computer terminal shown in FIG. 1, but is not limited to this. As shown in FIG. 6, an apparatus 600 includes one or more processor(s) 602 or data processing unit(s) and memory 604. The apparatus 600 may further include one or more input/output interface(s) 606 and one or more network interface(s) 608.

The memory 604 is an example of computer readable medium. The memory 604 may store therein a plurality of modules or units including a processing module 610 and a communication module 612.

The processing module 610 is configured to acquire verification code parameters required for generating a verification code, and use the verification code parameters as an input to a three-dimensional model to generate a three-dimensional image, wherein recognizable content corresponding to a specified visual focus position of a user is embedded in the three-dimensional image. Optionally, the process of generating the three-dimensional image may be expressed as, but is not limited to, the following processing process: (1) generating a background picture and a user-recognizable foreground picture according to the verification code parameters; and (2) disposing the background picture and the foreground picture which are at different levels at different visual focus positions according to a preset depth of field to generate the three-dimensional image.

Popularly speaking, generation of the three-dimensional image means enabling a person to directly see a three-dimensional image in a plane by using a visual difference between two eyes of the person and an optical reflection principle. An object in the image may be protruded from the image or hidden in the image, and this is mainly embodied based on light-shadow contrast, real-virtual contrast, and bright-shade contrast. The observer may observe the object in the image at a particular angle or by using a special device. The principle is that the observer may observe a three-dimensional image by focusing the eyesight in rear of (a distant position) or in front of (a near position) of the image. The purpose of changing the visual focus position is to make two repeated images adjacent on the three-dimensional image "look as if" they overlap with each other, and to produce a stereoscopic sense by using a difference between the overlapping images.

Optionally, the processing module 610 is further configured to generate a background picture and a user-recognizable foreground picture according to the verification code parameters; and dispose the background picture and the foreground picture which are at different levels at different visual focus positions according to a preset depth of field to generate the three-dimensional image.

Optionally, the processing module 610 is further configured to randomly select one or more verification code parameters from the acquired verification code parameters required for generating a verification code to serve as verification code parameters for generating the background picture and the foreground picture; and generate the background picture and the foreground picture according to the randomly selected verification code parameters.

The communication module 612 is configured to send the three-dimensional image to a client terminal as a verification code for display.

Optionally, in order to further improve user experience and the recognition efficiency of the verification code, the communication module 612 is further configured to send, to the client terminal, the specified visual focus position for prompting the user to recognize the recognizable content from the three-dimensional image. Optionally, the specified visual focus position and the verification code may be sent separately as two independent processes or may be sent simultaneously. For example, if the specified visual focus position and the verification code are sent simultaneously, indication information for indicating the specified visual focus position may be inserted into the three-dimensional image and sent to the client terminal.

It should be noted that the modules in this example embodiment may be embodied in the form of software or hardware. The hardware form may be expressed as, but is not limited to, the following forms: 1) the processing module 610 is a processor such as a CPU, and the communication module is a wireless communication module (such as a mobile communication module) or a wired communication module, or the like.

Example Embodiment 3

Figure 7:
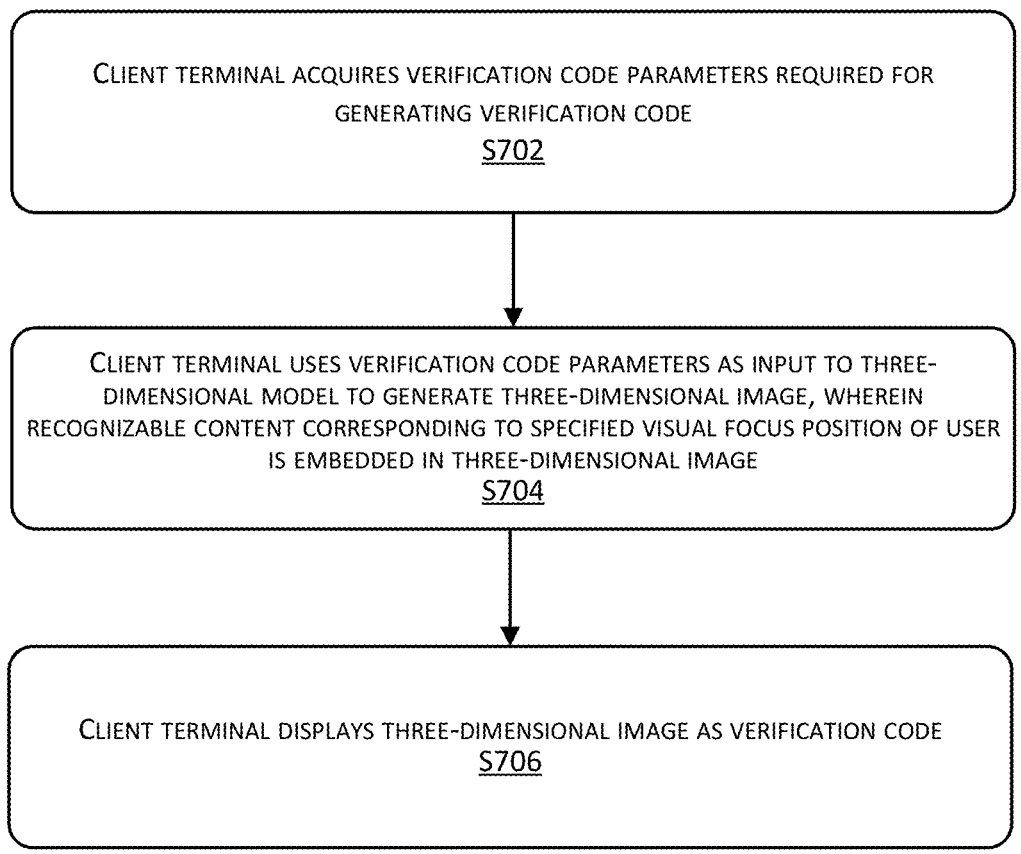
FIG. 7 is a schematic flowchart of another optional verification code-based verification processing method according to an example embodiment of the present disclosure.

As described in Example embodiment 1 and Example embodiment 2, a verification code in this example embodiment of the present application may be generated on the server side and may also be generated on the client terminal side. Specifically, this example embodiment provides a verification code-based verification processing method in a scenario where the verification code is generated by the client terminal. FIG. 7 is a schematic flowchart of another optional verification code-based verification processing method according to an example embodiment of the present disclosure. As shown in FIG. 7, the method includes the following steps:

Step S702. A client terminal acquires verification code parameters required for generating a verification code.

Optionally, the client terminal may acquire verification code parameters in many manners. For example, all the verification code parameters may be acquired from the client terminal locally. Certainly, all the verification code parameters may also be acquired from the server. Alternatively, some of the verification code parameters may be acquired from the client terminal and the rest of the verification code parameters required for generating a verification code may be acquired from the server (for example, larger data such as pictures may be acquired from the server).

Step S704. The client terminal uses the verification code parameters as an input to a three-dimensional model to generate a three-dimensional image, wherein recognizable content corresponding to a specified visual focus position of a user is embedded in the three-dimensional image. The recognizable content in the three-dimensional image is content corresponding to the specified visual focus position. Therefore, an observer may recognize the recognizable content only when the observer observes from the specified visual focus position, thus enhancing the security of the verification code recognition process.

In an optional example embodiment, the process of generating the three-dimensional image may be expressed as, but is not limited to, the following implementation form: generating, by the client terminal, a background picture and a user-recognizable foreground picture according to the verification code parameters; and disposing, by the client terminal, the background picture and the foreground picture which are at different levels at different visual focus positions according to a preset depth of field to generate the three-dimensional image.

To further increase the difficulty in decompiling the verification code, the verification code parameters may be randomly selected in the process of generating the verification code. Specifically, the client terminal randomly selects one or more verification code parameters from the acquired verification code parameters required for generating a verification code to serve as verification code parameters for generating the background picture and the foreground picture; and generates the background picture and the foreground picture according to the randomly selected verification code parameters.

Step S706. The client terminal displays the three-dimensional image as a verification code.

Optionally, the verification code parameters may include, but are not limited to, one or more of the following parameters: text, an image, and a distortion parameter, a position or a color of the text or image.

In order to further improve the recognition efficiency of the verification code and enhance user experience, when displaying the three-dimensional image as a verification code, the client terminal displays the specified visual focus position for prompting the user to recognize the recognizable content from the three-dimensional image. As such, the observer (user) may rapidly recognize the recognizable content in the three-dimensional image.

The specified visual focus position may be displayed in many manners. For example, the specified visual focus position may be displayed by using a static image or a dynamic image. The specified visual focus position and the three-dimensional image may be displayed separately, or indication information for indicating the specified visual focus position may be inserted into the three-dimensional image for display.

In the solution provided in this example embodiment, the client terminal generates a verification code locally. Therefore, the client terminal may verify the verification code locally. That is, after the client terminal displays the three-dimensional image as a verification code, the client terminal receives a verification code that is generated by the user according to the three-dimensional image, and verifies the verification code, wherein the verification succeeds when the input verification code is consistent with the recognizable content in the three-dimensional image. Certainly, the foregoing verification process may also be performed by the server. In this case, the client terminal may send the recognizable content in the three-dimensional image to the server in advance, and then sends user-input content to the server to perform verification.

For an optional implementation solution of this example embodiment, reference may be made to the related solutions in Example embodiment 1 and Example embodiment 2. Details are not described here.

Example Embodiment 4

Figure 8:
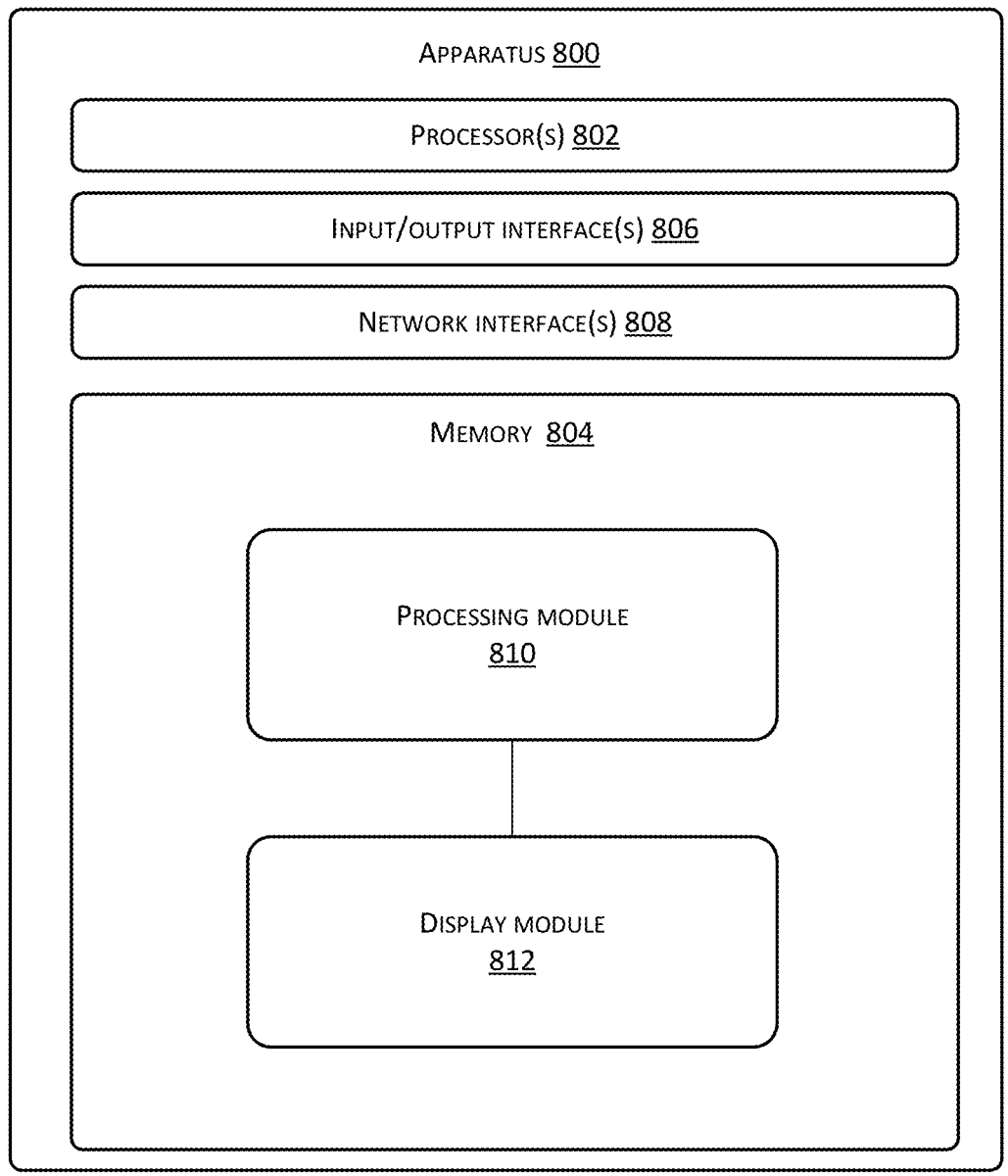
FIG. 8 is a structural block diagram of another optional verification code-based verification processing apparatus according to an example embodiment of the present disclosure.

According to this example embodiment of the present disclosure, an apparatus for implementing the foregoing verification code-based verification processing method is further provided. The apparatus may be applied to a client terminal or may run on the computer terminal shown in FIG. 1, or may run on a computer terminal which has more or fewer functional modules than the computer terminal shown in FIG. 1, but is not limited to this. As shown in FIG. 8, an apparatus 800 includes one or more processor(s) 802 or data processing unit(s) and memory 804. The apparatus 800 may further include one or more input/output interface(s) 806 and one or more network interface(s) 808.

The memory 804 is an example of computer readable medium. The memory 804 may store therein a plurality of modules or units including a processing module 810 and a display module 812.

The processing module 810 is configured to acquire verification code parameters required for generating a verification code, and use the verification code parameters as an input to a three-dimensional model to generate a three-dimensional image, wherein recognizable content corresponding to a specified visual focus position of a user is embedded in the three-dimensional image.

Optionally, the processing module 810 is configured to acquire the verification code parameters from the client terminal locally and/or from a server.

In an optional example embodiment, the processing module 810 is configured to generate the three-dimensional image in the following manner: generate a background picture and a user-recognizable foreground picture according to the verification code parameters; and dispose the background picture and the foreground picture which are at different levels at different visual focus positions according to a preset depth of field to generate the three-dimensional image. Because the background picture and the foreground picture are disposed at different visual focus positions, a fuzzy image occurs (that is, unrecognizable content) when the observer observes at other visual focus positions except the specified visual focus position.

The display module 812 is connected to the processing module 810 and is configured to display the three-dimensional image as a verification code.

Optionally, the display module 812 is further configured to: when displaying the three-dimensional image as a verification code, display the specified visual focus position for prompting the user to recognize the recognizable content from the three-dimensional image. As such, the observer may rapidly recognize the recognizable content in the three-dimensional image, thus improving user experience.

It should be noted that the foregoing processing modules may be implemented by software (for example, the display module 812 is a display interface on a terminal) or hardware. When implemented by hardware, the processing module may be implemented in, but is not limited to, the following manner: the processing module 810 is a processor such as a CPU; and the display module 812 may be a display, or the like.

Example Embodiment 5

This example embodiment of the present disclosure may provide a computer terminal. The computer terminal may be any computer terminal device in a computer terminal group. Optionally, in this example embodiment, the computer terminal may also be replaced with a terminal device such as a mobile terminal.

Optionally, in this example embodiment, the computer terminal may be at least one network device in multiple network devices located in a computer network.

In this example embodiment, the computer terminal may execute program codes of the following steps in the verification code-based verification processing method: a server acquiring verification code parameters required for generating a verification code; the server using the verification code parameters as an input to a three-dimensional model to generate a three-dimensional image, wherein recognizable content corresponding to a specified visual focus position of a user is embedded in the three-dimensional image; and the server sending the three-dimensional image to a client terminal as a verification code for display.

Figure 9:
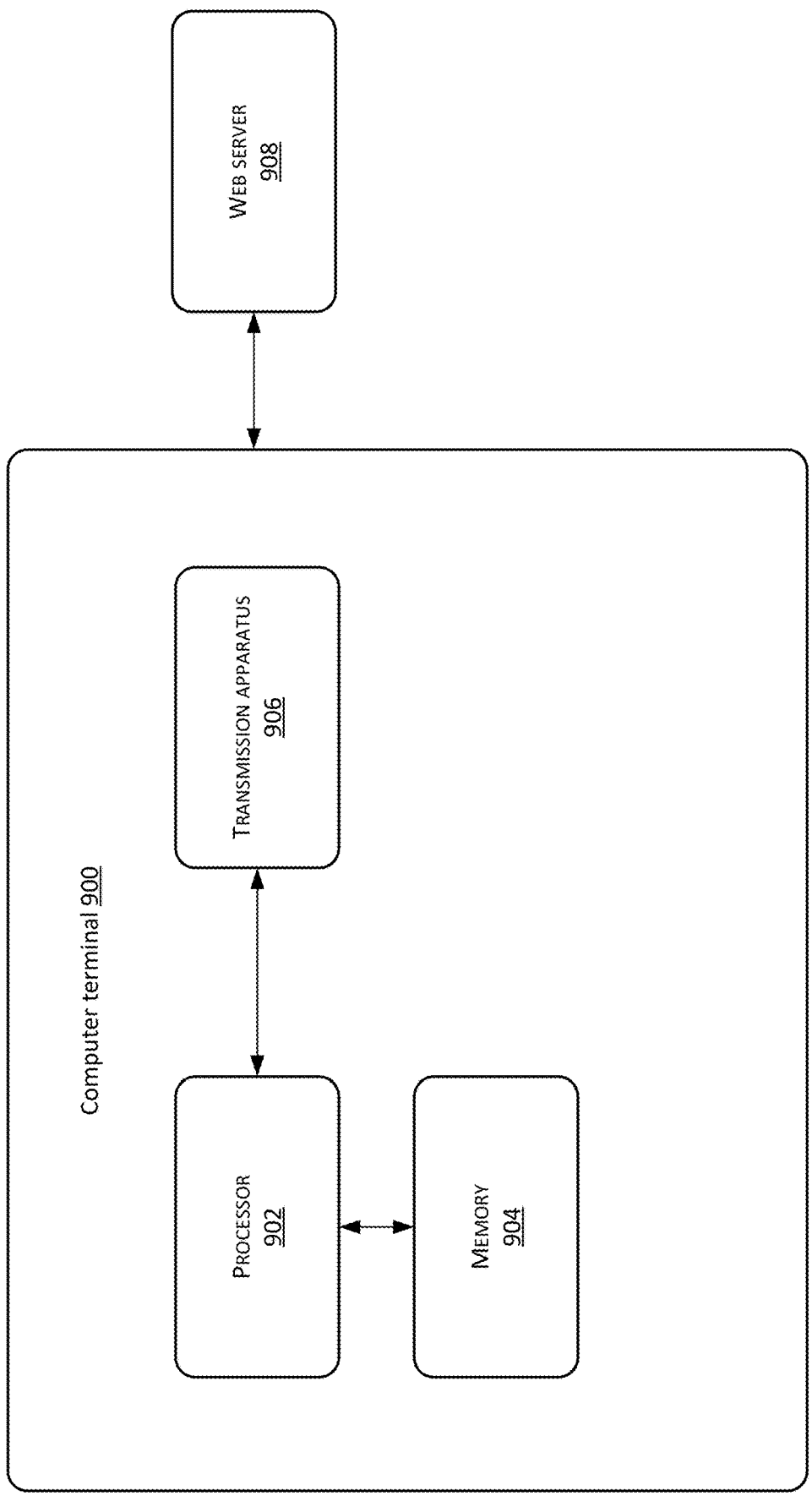
FIG. 9 is a structural block diagram of a computer terminal according to an example embodiment of the present disclosure.

Optionally, FIG. 9 is a structural block diagram of a computer terminal according to an example embodiment of the present disclosure. As shown in FIG. 9, a computer terminal 900 may include: one or more (only one is shown in the figure) processors 902, a memory 904, and a transmission apparatus 906 connected to a web server 908.

The processor 902 may call, through the transmission apparatus, information and an application program stored in the memory 904, so as to execute the following steps: randomly selecting multiple verification code generation rules from a multi-dimension verification code generation rule, wherein the multi-dimension verification code generation rule is formed by verification code generation rules of different dimensions; combining the randomly selected multiple verification code generation rules to obtain a combined rule; and generating a final verification code according to the combined rule, and sending the verification code to the terminal through the transmission apparatus 906 to display the verification code.

Optionally, the processor 902 may further execute program codes of the following steps: generating a background picture and a user-recognizable foreground picture according to the verification code parameters; and disposing the background picture and the foreground picture which are at different levels at different visual focus positions according to a preset depth of field to generate the three-dimensional image.

Optionally, the processor 902 may further execute program codes of the following steps: randomly selecting one or more verification code parameters from the acquired verification code parameters required for generating a verification code to serve as verification code parameters for generating the background picture and the foreground picture; and generating the background picture and the foreground picture according to the randomly selected verification code parameters.

Optionally, the processor 902 may further execute program codes of the following step: sending, to the client terminal through the transmission apparatus 906, the specified visual focus position for prompting the user to recognize the recognizable content from the three-dimensional image.

Optionally, the processor 902 may further execute program codes of the following step: inserting indication information for indicating the specified visual focus position into the three-dimensional image, and sending the three-dimensional image to the client terminal through the transmission apparatus 906.

Those of ordinary skill in the art may understand that the structure shown in FIG. 9 is merely an example. The computer terminal may also be a terminal device such as a smart phone (such as an Android phone, an iOS phone, or the like), a tablet computer, a palmtop computer, a Mobile Internet Device (MID), or a PAD. FIG. 9 does not limit the structure of the foregoing electronic apparatus. For example, the computer terminal A may further include more or fewer components (a network interface, a display apparatus, or the like) than those shown in FIG. 9, or has a configuration different from that shown in FIG. 9.

Those of ordinary skill in the art may understand that all or some steps in the methods in the foregoing example embodiments may be completed by a program instructing related hardware of the terminal device. The program may be stored in a computer readable storage medium. The storage medium may include: a flash disk, a Read-Only Memory (ROM), a Random Access Memory (RAM), a magnetic disk, an optical disc, or the like.

Example Embodiment 6

The example embodiments of the present disclosure further provide a storage medium. Optionally, in this example embodiment, the storage medium may be configured to store program codes executed by the verification code-based verification processing method provided in Example embodiment 1.

Optionally, in this example embodiment, the storage medium may be located in any computer terminal in a computer terminal group in a computer network or located in any mobile terminal in a mobile terminal group.

Optionally, in this example embodiment, the storage medium is configured to store program codes for executing the following steps: acquiring verification code parameters required for generating a verification code; using the verification code parameters as an input to a three-dimensional model to generate a three-dimensional image, wherein recognizable content corresponding to a specified visual focus position of a user is embedded in the three-dimensional image; and sending the three-dimensional image to a client terminal as a verification code for display.

It should be noted here that any computer terminal in the computer terminal group may establish a communication relationship with a web server.

Example Embodiment 7

The example embodiments of the present disclosure may provide another computer terminal. The computer terminal may be any computer terminal device in a computer terminal group. Optionally, in this example embodiment, the computer terminal may also be replaced with a terminal device such as a mobile terminal.

Optionally, in this example embodiment, the computer terminal may be at least one network device in multiple network devices located in a computer network.

In this example embodiment, the computer terminal may execute program codes of the following steps in the verification code-based verification processing method: a client terminal acquiring verification code parameters required for generating a verification code; the client terminal using the verification code parameters as an input to a three-dimensional model to generate a three-dimensional image, wherein recognizable content corresponding to a specified visual focus position of a user is embedded in the three-dimensional image; and the client terminal displaying the three-dimensional image as a verification code.

For a specific structure or configuration in the computer terminal in this example embodiment, reference may be made to the structure or configuration of the computer terminal shown in FIG. 1 or FIG. 7, but is not limited to this.

Example Embodiment 8

The example embodiments of the present disclosure further provide another storage medium. Optionally, in this example embodiment, the storage medium may be configured to store program codes executed by the verification code-based verification processing method provided in Example embodiment 1.

Optionally, in this example embodiment, the storage medium may be located in any computer terminal in a computer terminal group in a computer network or located in any mobile terminal in a mobile terminal group.

Optionally, in this example embodiment, the storage medium is configured to store program codes for executing the following steps: a client terminal acquiring verification code parameters required for generating a verification code; the client terminal using the verification code parameters as an input to a three-dimensional model to generate a three-dimensional image, wherein recognizable content corresponding to a specified visual focus position of a user is embedded in the three-dimensional image; and the client terminal displaying the three-dimensional image as a verification code.

The serial numbers of the foregoing example embodiments of the present disclosure are merely used for description, and do not imply the preference among the example embodiments.

In the foregoing example embodiments of the present disclosure, the description of each example embodiment has respective focuses. For a part that is not described in detail in an example embodiment, reference may be made to related description in other example embodiments.

In the several example embodiments provided in the present application, it should be understood that the disclosed client terminal may be implemented in other manners. The apparatus example embodiment described above is merely schematic. For example, the unit division is merely logical function division, and there may be other division manners in an actual implementation manner. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between units or modules may be implemented in an electronic form or other forms.

Units described as separate parts may or may not be physically separate, parts displayed as units may or may not be physical units, and they may be located at the same place, or distributed on multiple network units. The objective of the solution of the example embodiment may be implemented by selecting some or all of the units according to actual requirements.

In addition, functional units in the example embodiments of the present disclosure may be integrated in a processing unit, or the units may also exist physically separately, or two or more units are integrated in one unit. The integrated unit may be implemented in the form of hardware or in the form of a software functional unit.

When the integrated unit is implemented in the form of a software functional unit and sold or used as an independent product, the integrated unit may be stored in a computer readable storage medium. Based on such understanding, the technical solutions of the present disclosure essentially, or the part making contributions to the prior art, or some or all of the technical solutions may be implemented in the form of a software product. The computer software product may be stored in a storage medium and include several instructions for instructing a computer device (which may be a personal computer, a server, a network device, or the like) to execute all or some steps of the methods of example embodiments of the present disclosure. The foregoing storage medium includes any medium that may store program codes, such as a USB flash drive, a Read-Only Memory (ROM), a Random Access Memory (RAM), a mobile hard disk drive, a magnetic disk, or an optical disc.

Described above are merely example implementation manners of the present disclosure. It should be noted that those of ordinary skill in the art may further make several improvements or modifications without departing from the principle of the present disclosure, and these improvements and modifications should also be construed as the protection scope of the present disclosure.

The present disclosure may further be understood with clauses as follows.

Clause 1. A verification code-based verification processing method comprising:

acquiring, by a server, verification code parameters required for generating a verification code;

using, by the server, the verification code parameters as an input to a three-dimensional model to generate a three-dimensional image, wherein recognizable content corresponding to a specified visual focus position of a user is embedded in the three-dimensional image; and sending, by the server, the three-dimensional image to a client terminal as the verification code for display.

Clause 2. The method of clause 1, wherein the using the verification code parameters as the input to the three-dimensional model to generate the three-dimensional image comprises:

generating, by the server, a background picture and a user-recognizable foreground picture according to the verification code parameters; and disposing, by the server, the background picture and the foreground picture, which are at different levels, at different visual focus positions according to a preset depth of field to generate the three-dimensional image.

Clause 3. The method of clause 2, wherein the generating the background picture and the user-recognizable foreground picture according to the verification code parameters comprises:

randomly selecting, by the server, one or more verification code parameters from the acquired verification code parameters required for generating the verification code as verification code parameters for generating the background picture and the foreground picture; and generating the background picture and the foreground picture according to the randomly selected verification code parameters.

Clause 4. The method of clause 1, wherein the verification code parameters comprise one or more of the following parameters:

a text;

an image;

a distortion parameter of the text or the image;

a position of the text or the image; and a color of the text or image.

Clause 5. The method of any of clauses 1 to 4, wherein when the server sends the three-dimensional image to the client terminal as the verification code, the method further comprises:

sending, by the server, to the client terminal, the specified visual focus position for prompting the user to recognize the recognizable content from the three-dimensional image.

Clause 6. The method of clause 5, wherein the sending to the client terminal the prompt to identify the specified visual focus position for the user to recognize the recognizable content from the three-dimensional image comprises:

inserting, by the server, indication information for indicating the specified visual focus position into the three-dimensional image; and sending, by the server, the three-dimensional image to the client terminal.

Clause 7. The method of any of clauses 1 to 4, wherein before the acquiring the verification code parameters required for generating the verification code, the method further comprises:

receiving, by the server, a verification code acquisition request of the client terminal.

Clause 8. A verification code-based verification processing apparatus, which is applied to a server, comprising:

a processing module configured to acquire verification code parameters required for generating a verification code, and use the verification code parameters as an input to a three-dimensional model to generate a three-dimensional image, wherein recognizable content corresponding to a specified visual focus position of a user is embedded in the three-dimensional image; and a communication module configured to send the three-dimensional image to a client terminal as the verification code for display.

Clause 9. The apparatus of clause 8, wherein the processing module is further configured to generate a background picture and a user-recognizable foreground picture according to the verification code parameters; and dispose the background picture and the foreground picture, which are at different levels, at different visual focus positions according to a preset depth of field to generate the three-dimensional image.

Clause 10. The apparatus of clause 9, wherein the processing module is further configured to randomly select one or more verification code parameters from the acquired verification code parameters required for generating the verification code to serve as verification code parameters for generating the background picture and the foreground picture; and generate the background picture and the foreground picture according to the randomly selected verification code parameters.

Clause 11. The apparatus of any of clauses 8 to 10, wherein the communication module is further configured to send, to the client terminal, the specified visual focus position for prompting the user to recognize the recognizable content from the three-dimensional image.

Clause 12. A verification code-based verification processing method comprising:

acquiring, by a client terminal, verification code parameters required for generating a verification code;

using, by the client terminal, the verification code parameters as an input to a three-dimensional model to generate a three-dimensional image, wherein recognizable content corresponding to a specified visual focus position of a user is embedded in the three-dimensional image; and displaying, by the client terminal, the three-dimensional image as the verification code.

Clause 13. The method of clause 12, wherein the acquiring the verification code parameters required for generating the verification code comprises:

acquiring, by the client terminal, the verification code parameters from the client terminal locally and/or from a server.

Clause 14. The method of clause 12, wherein the using the verification code parameters as the input to the three-dimensional model to generate the three-dimensional image comprises:

generating, by the client terminal, a background picture and a user-recognizable foreground picture according to the verification code parameters; and disposing, the client terminal, the background picture and the foreground picture, which are at different levels, at different visual focus positions according to a preset depth of field to generate the three-dimensional image.

Clause 15. The method of clause 14, wherein the generating the background picture and the user-recognizable foreground picture according to the verification code parameters comprises:

randomly selecting, by the client terminal, one or more verification code parameters from the acquired verification code parameters required for generating the verification code to serve as verification code parameters for generating the background picture and the foreground picture; and generating the background picture and the foreground picture according to the randomly selected verification code parameters.

Clause 16. The method of clause 12, wherein the verification code parameters comprise one or more of the following parameters:

a text;

an image;

a distortion parameter of the text or the image;

a position of the text or the image; and a color of the text or image.

Clause 17. The method of any of clauses 12 to 16, wherein when the client terminal displays the three-dimensional image as the verification code, the method further comprises:

displaying, by the client terminal, the specified visual focus position for prompting the user to recognize the recognizable content from the three-dimensional image.

Clause 18. The method of clause 17, wherein the displaying the prompt to identify the specified visual focus position for the user to recognize the recognizable content from the three-dimensional image comprises:

inserting indication information for indicating the specified visual focus position into the three-dimensional image; and displaying the three-dimensional image.

Clause 19. The method of clause 12, wherein after the displaying the three-dimensional image as the verification code, the method further comprises:

receiving, by the client terminal, a verification code input by the user according to the three-dimensional image;

verifying the input verification code; and passing verification in response to determining that the input verification code is consistent with the recognizable content in the three-dimensional image.

Clause 20. A verification code-based verification processing apparatus, which is applied to a client terminal, comprising:

a processing module configured to acquire verification code parameters required for generating a verification code, and use the verification code parameters as an input to a three-dimensional model to generate a three-dimensional image, wherein recognizable content corresponding to a specified visual focus position of a user is embedded in the three-dimensional image; and a display module configured to display the three-dimensional image as a verification code.

Clause 21. The apparatus of clause 20, wherein the processing module is configured to acquire the verification code parameters from the client terminal locally and/or from a server.

Clause 22. The apparatus of clause 20, wherein the processing module is configured to generate a background picture and a user-recognizable foreground picture according to the verification code parameters; and dispose the background picture and the foreground picture, which are at different levels, at different visual focus positions according to a preset depth of field to generate the three-dimensional image.

Clause 23. The apparatus of any of clauses 20 to 22, wherein the display module is further configured to, when displaying the three-dimensional image as the verification code, display the specified visual focus position for prompting the user to recognize the recognizable content from the three-dimensional image.

What is claimed is:
1. A method comprising:
  acquiring, by a server, verification code parameters required for generating a verification code;

using, by the server, the verification code parameters as an input to a three-dimensional model to generate a three-dimensional image according to a preset depth of field, the using the verification code parameters as the input to the three-dimensional model to generate the three-dimensional image including:
  generating, by the server, a background picture and a foreground picture according to the verification code parameters; and
  disposing, by the server, the background picture and the foreground picture at different visual focus positions according to the preset depth of field to generate the three-dimensional image; and
embedding a recognizable content corresponding to a specified visual focus position in the three-dimensional image.

2. The method of claim 1, wherein the foreground picture is recognizable by a user.

3. The method of claim 1, wherein the background picture and the foreground picture are at different focus positions.

4. The method of claim 1, wherein the generating the background picture and the user-recognizable foreground picture according to the verification code parameters comprises:
  randomly selecting, by the server, one or more verification code parameters from the acquired verification code parameters required for generating the verification code as verification code parameters for generating the background picture and the foreground picture; and
  generating the background picture and the foreground picture according to the randomly selected verification code parameters.

5. The method of claim 1, wherein the verification code parameters comprise one or more of the following parameters:
  a text;
  an image;
  a distortion parameter of the text or the image;
  a position of the text or the image; and
  a color of the text or image.

6. The method of claim 1, further comprising:
  sending, by the server, the three-dimensional image to a client terminal as the verification code for display.

7. The method of claim 1, further comprising receiving, by the server, a verification code acquisition request of a client terminal.

8. The method of claim 6, further comprising
  sending, by the server, the specified visual focus position to the client terminal for prompting a user to recognize the recognizable content from the three-dimensional image.

9. The method of claim 8, wherein the specified visual focus position to the client terminal for prompting a user to recognize the recognizable content from the three-dimensional image comprises:
  inserting, by the server, indication information for indicating the specified visual focus position into the three-dimensional image; and
  sending, by the server, the indication information to the client terminal for display to the user.

10. A method comprising:
  acquiring, by a client terminal, verification code parameters required for generating a verification code;
  using, by the client terminal, the verification code parameters as an input to a three-dimensional model to generate a three-dimensional image, wherein a recognizable content corresponding to a specified visual focus position is embedded in the three-dimensional image, the verification code parameters as the input to the three-dimensional model to generate the three-dimensional image including:
    generating, by the client terminal, a background picture and a foreground picture according to the verification code parameters; and
    disposing, the client terminal, the background picture and the foreground picture at different visual focus positions according to a preset depth of field to generate the three-dimensional image; and
  displaying, by the client terminal, the three-dimensional image as the verification code.

11. The method of claim 10, wherein the acquiring the verification code parameters required for generating the verification code comprises:
  acquiring, by the client terminal, the verification code parameters from the client terminal locally or a server.

12. The method of claim 10, wherein the background picture and the foreground picture are at different focus positions.

13. The method of claim 10, wherein the generating the background picture and the user-recognizable foreground picture according to the verification code parameters comprises:
  randomly selecting, by the client terminal, one or more verification code parameters from the acquired verification code parameters required for generating the verification code to serve as verification code parameters for generating the background picture and the foreground picture; and
  generating, by the client terminal, the background picture and the foreground picture according to the randomly selected verification code parameters;
  a distortion parameter of the text or the image;
  a position of the text or the image; and
  a color of the text or image.

14. The method of claim 10, further comprising:
  displaying, by the client terminal, the specified visual focus position for prompting a user to recognize the recognizable content from the three-dimensional image.

15. The method of claim 10, wherein the verification code parameters comprise one or more of the following parameters:
  a text;
  an image;
  a distortion parameter of the text or the image;
  a position of the text or the image; and
  a color of the text or image.

16. The method of claim 14, wherein the displaying the prompt to identify the specified visual focus position for the user to recognize the recognizable content from the three-dimensional image comprises:
  inserting indication information for indicating the specified visual focus position into the three-dimensional image; and
  displaying the indication information.

17. The method of claim 14, further comprising:
  receiving, by the client terminal, another verification code input by a user according to the three-dimensional image;
  determining that the received another verification code is consistent with the recognizable content in the three-dimensional image; and
  determining that the user passes a verification.

18. An apparatus comprising:
one or more processors; and
one or more memories storing thereon computer-readable instructions that, when executed by the one or more processors, cause the one or more processors to perform acts comprising:
  acquiring verification code parameters required for generating a verification code;
  using the verification code parameters as an input to a three-dimensional model to generate a three-dimensional image, wherein a recognizable content corresponding to a specified visual focus position of a user is embedded in the three-dimensional image, the using the verification code parameters as the input to the three-dimensional model to generate the three-dimensional image including:
    generating a background picture and a foreground picture according to the verification code parameters; and
    disposing the background picture and the foreground picture at different visual focus positions according to the preset depth of field to generate the three-dimensional image;
  sending the three-dimensional image to a client terminal as the verification code for display; and
  sending the specified visual focus position to the client terminal to prompt the user to recognize the recognizable content from the three-dimensional image.

19. The apparatus of claim 18, wherein the verification code parameters comprise one or more of the following parameters:
  a text;
  an image;
  a distortion parameter of the text or the image;
  a position of the text or the image; and
  a color of the text or image.

20. The apparatus of claim 18, wherein the generating the background picture and the user-recognizable foreground picture according to the verification code parameters comprises:
  randomly selecting one or more verification code parameters from the acquired verification code parameters required for generating the verification code to serve as verification code parameters for generating the background picture and the foreground picture; and
  generating the background picture and the foreground picture according to the randomly selected verification code parameters.

* * * * *